United States Patent Office 3,507,905
Patented Apr. 21, 1970

3,507,905
CONTINUOUS PREPARATION OF GLYCOL PHTHALATES
Antoine Girantet, La Mulatiere, Pierre Yves André Lafont, Foy-les-Lyon, and Jean François Roget and Philippe Yvon Tarbouriech, Lyon, France, assignors to Rhone-Poulenc S.A., Paris, France, a French body corporate
Filed June 3, 1966, Ser. No. 555,208
Claims priority, application France, June 9, 1965, 20,074, Patent 1,449,727
Int. Cl. C07c 69/80, 69/82
U.S. Cl. 260—475                              6 Claims

ABSTRACT OF THE DISCLOSURE

The invention provides a process for preparing glycol phthalates, especially β-hydroxyethyl terephthalate, by passing a mixture in substantially stoichiometric proportions of a lower alkanol phthalate and a glycol into a first heated zone, continuously removing a lower alkanol, but substantially no glycol, overhead from the said zone, continuously removing liquid reaction product from the said zone and feeding to a second zone at a pressure not higher than the first zone, and withdrawing from the second zone, as vapour overhead, lower alkanol vapour and any excess of glycol, and, as liquid, glycol phthalate product.

---

Figure 1:
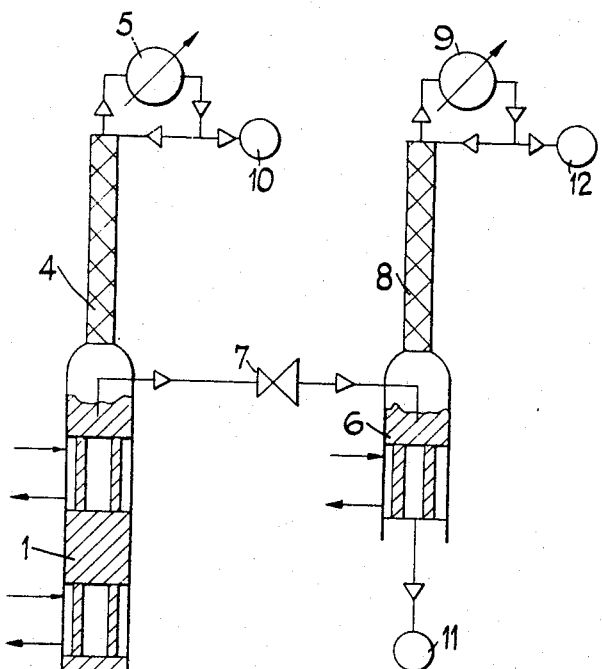

This invention relates to the continuous preparation of glycol phthalates, especially β-hydroxyethyl terephthalate, by transesterification of a lower alkanol phthalate with a glycol. Glycol phthalates are useful in the manufacture of polyesters by polycondensation. As usually prepared, and as prepared by the process of this invention, they generally contain a proportion of oligomeric esters, which do not interfere with their use in the production of polyesters. Accordingly, references herein to glycol phthalates are to be understood as references to mixtures of glycol phthalates with oligomers thereof as well as to glycol phthalates themselves.

The transesterification of a phthalate, e.g. methyl terephthalate, with a glycol, e.g. ethylene glycol, is an equilibrium reaction, and various devices have been used to displace the equilibrium so that the desired glycol ester is the predominant product under satisfactory continuous manufacturing conditions. Thus it has been proposed to prepare β-hydroxyethyl terephthalate by reaction of ethylene glycol with dimethyl terephthalate in a plate column or a packed column, in which the reagents circulate in a downward direction so as to create in the column a reaction zone where the ratio of the number of moles of free glycol to the number of moles of terephthalate radicals is at least equal to 3. If the ethylene glycol content in the reaction mixture falls, the degree of conversion of the dimethyl terephthalate is mediocre, the removal of the methyl alcohol formed is incomplete, and the reaction takes longer. Apart from the delicate controls which this process requires, maintaining the glycol in reflux entails a considerable consumption of power.

It has also been proposed to use, for this transesterification, a reactor divided into several compartments which successively receive the reaction mixture and which communicate with a common rectification zone in order to eliminate the methanol directly at the rate at which it forms. This process also requires the use of a large amount of ethylene glycol, as the latter is carried away by the methanol. Furthermore, the total volume of the reaction mixture is low relative to the total volume of the apparatus and the power consumption is considerable.

A continuous process for the preparation of glycol phthalates, especially β-hydroxyethyl terephthalate, by transesterification has now been found which is easily and economically carried out and gives excellent degrees of conversion without requiring a high proportion of glycol in the reaction zone. The new process comprises continuously passing a mixture, in substantially stoichiometric proportions, of a lower alkanol terephthalate and a glycol into a first heated reaction zone continuously removing lower alkanol, but substantially no glycol, overhead as vapour from the said first zone, continuously removing liquid reaction product from the said first zone and feeding it to a second reaction zone at a pressure not higher than the said first zone, and withdrawing from the said second zone, as vapour overhead, lower alkanol vapour and any excess of glycol, and, as liquid, the glycol terephthalate product.

Preferably the first reaction zone is a vertical stepwise reactor and the alkanol phthalate and the glycol are introduced into the lower part thereof and the lower alkanol and liquid reaction product are withdrawn from the upper part of the said zone, the temperature of the zone increasing from bottom to top. Both zones are ordinarily at a temperature of 170° to 270° C. and a pressure of 1 to 5 bars gauge.

Figure 2:
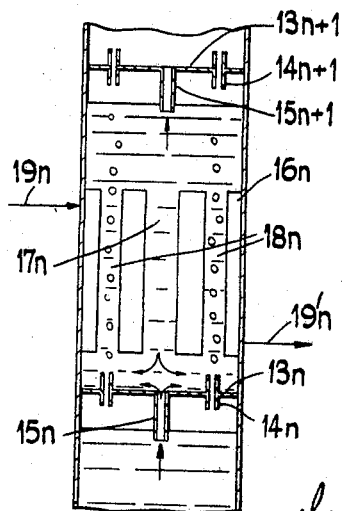
Figure 3:
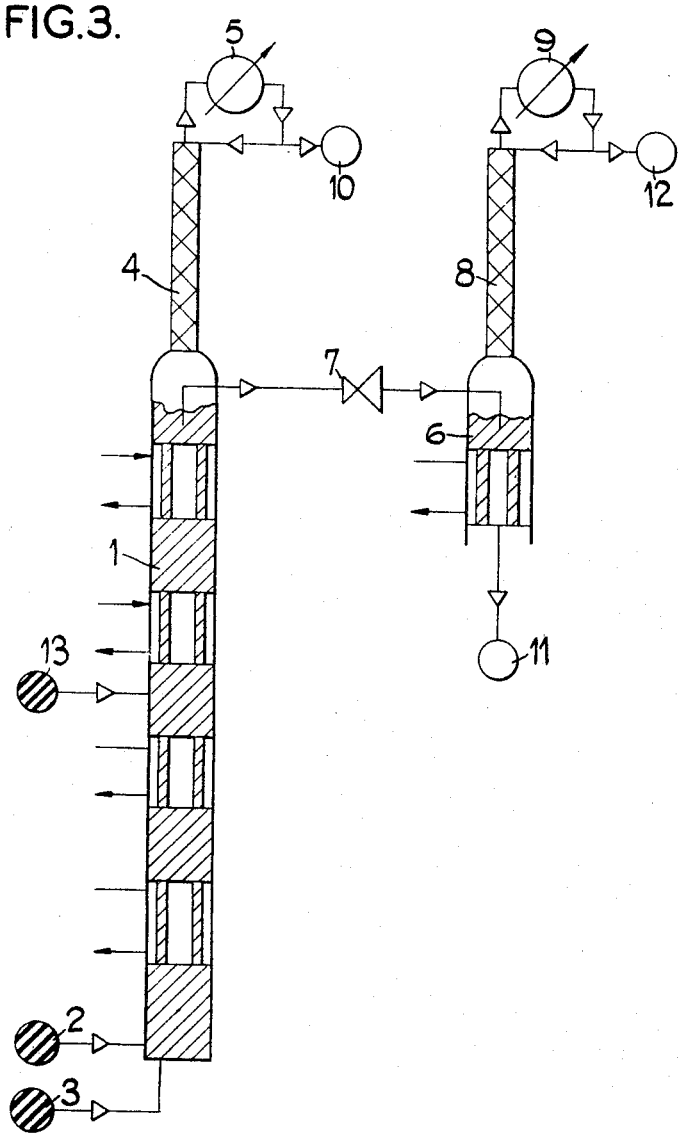

The apparatus preferably used for carrying out the process of the invention is as shown diagrammatically in the accompanying drawings, in which FIGURES 1 and 3 are diagrams of complete apparatus, and FIGURE 2 is a more detailed diagram of part of the apparatus of FIGURE 1. In FIGURE 1, a cylindrical vertical reactor 1 is divided into stages each comprising a heating device, such as for example an assembly of tubes, and a means of homogenisation, the reactor being equipped at the bottom with the reagent inlets 2 and 3, and being topped by a rectification column 4 with condenser 5 and receiver 10; a finisher 6 (providing the second reaction zone), heated in the same way, is fed at the top by the liquid product coming from the upper part of reactor 1 via 7, and is topped by a rectification column 8 with condenser 9 and receiver 12. It is provided at the bottom with an outlet for the glycol ester obtained, which passes to the receiver 11.

The stages of the reactor 1 are preferably of the construction indicated in FIGURE 2, in which $13_n$ and $13_{n+1}$ represent separating plates between stages; $14_n$ and $14_{n+1}$ represent nozzles for the passage of the vapours; $15_n$ and $15_{n+1}$ represent tubes for the passage of the liquid; $16_n$ represents an assembly of tubes consisting of a central tube $17_n$ of large diameter and tubes $18_n$ of smaller diameter distributed between the central tube and the wall of the reactor, these smaller diameter tubes each corresponding to a nozzle $14_n$ positioned just below; and $19_n$ and $19'_n$ represent the inlet and outlet of the heating fluid.

This apparatus is used as follows. For convenience, the reaction described will be that between dimethyl terephthalate and ethylene glycol. Molten dimethyl terephthalate and preheated ethylene glycol are introduced via 2 and 3, together with the transesterification catalyst, into the bottom of the reactor 1 which is heated to a sufficiently high temperature for the transesterification to take place. The reaction mixture moves in an upward direction, and is agitated by the evolution of free methanol as the reaction progresses. The methanol vapour is withdrawn via column 4, condensed in 5, and collected in receiver 10. The reaction mixture, which has thus been freed of the major part of the methanol, is directed via 7 to the finisher 6 which is heated to a sufficient temperature to complete the transesterification. The methanol liberated in the finisher is withdrawn via column 8, condensed in 9, and collected in receiver 12. Part of the unreacted ethylene glycol is recovered via column 8. The desired glycol esters are collected at the bottom of the finisher at 11. They only contain a minimal amount of ethylene glycol and may be used for polycondensations as they are.

The temperature in the reactor 1 may be the same at all points. However it is preferable for the temperature to rise progressively from the bottom to the top, and as already stated, temperatures in the range of 170° to 270° C. are very suitable. The pressure at the head of the reactor is controlled so that easy rectification of the vapours is achieveable at the particular reaction temperature used. Depending on the temperature of the liquid phase at the top of the reactor, the process may be carried out at atmospheric pressure or at a slightly higher pressure, for example of the order of 4 bars (gauge pressure). Under these conditions, the glycol remains in the liquid phase throughout the reactor and a high degree of conversion is achieved. Since the reactor is vertical, the pressure at the bottom is obviously greater than that at the top of the reactor, as a result of the weight of the reaction mixture and the pressure drop. This pressure is generally from 1 to 5 bars (gauge pressure).

The temperature in the finisher (second reaction zone) is substantially the same as the temperature of the mixture leaving the reactor (first reaction zone), and is preferably above 200° C. The pressure at the inlet of the finisher may be the same as the pressure at the top of the reactor, but is preferably lower.

The ethylene glycol and the diamethyl terephthalate are introduced into the reactor is a molar ratio of 1.1:1 to 4:1, preferably 1.5:1 to 3:1, the stoichiometric ratio being 2:1. For reasons of convenience the transesterification catalyst is introduced with the ethylene glycol. Though the ethylene glycol is introduced at the bottom of the reactor, as indicated above, it may sometimes be useful to introduce part of it as convenient points along the height of the reactor. The degree of conversion is of the order of 90% for the products reaching the top of the reactor and about 99% for the product withdrawn at the bottom of the finisher.

The process of the invention has the advantage of being simple and rapid to start up and having a high productivity per unit volume of equipment. The operation of the apparatus is highly reliable and no blockages in the rectification column of the reactor occur, this being due to the fact that this column is situated at a point where there is very little methyl terephthalate present.

The process of the invention is not limited to the transesterification of methyl terephthalate by ethylene glycol, but may be applied to other transesterifications between phthalate esters of lower alkanols (i.e. alkanols of 1 to 6 carbon atoms) and various glycols (especially alkylene glycols of 2 to 4 carbon atoms). The working conditions, temperatures and pressures can readily be adapted to take into account the specific reagents present.

The following examples illustrate the invention.

EXAMPLE 1

The apparatus is schematically like that of FIGURE 1, the reactor 1 being 280 cm. high and 16 cm. in diameter, with 4 stages having the arrangement shown in FIGURE 2, each 62 cm. high and comprising an assembly of tubes 40 cm. high with a central tube of diameter 5 cm. and 6 tubes of diameter 29 mm., the separating plates between the stages each having 6 apertures of 3 mm. diameter and a central tube 8 mm. in diameter and 10 cm. long arranged as previously indicated, the distance between each such plate and the assembly of tubes immediately above it being 2 cm.

At the bottom of this reactor a stream of 7575 g./hour of methyl terephthalate at 170° C. is introduced through tube 2, and a stream of 5600 g./hour of ethylene glycol, preheated to 180° C. and containing 0.08% of calcium acetate and 0.02% of antimony trioxide based on the weight of the methyl terephthalate, is introduced through 3. At the level at which the reagents are introduced, the pressure is 3 bars gauge. The temperature is maintained at 198° C. at the bottom of the reactor and is progressively increased stage by stage so as to reach 248° C. at the top. From the beginning of the reaction evolution of gaseous methanol can be observed at the bottom of the reactor, and this increases as it rises therefrom through the reactor and stirs the reaction mixture. The methanol which has been evolved in this way is received by the column 4 and collected in 10, after condensation, at a rate of 2275 g./hour, corresponding to a degree of conversion of 91% of the methyl terephthalate at the top of the reactor. The liquid mixture which leaves the reactor under pressure through 7 contains the β-hydroxyethyl terephthalate which has been formed, as well as oligomers thereof, methyl terephthalate, ethylene glycol, and the methanol which has remained in the reaction mixture. The pressure on this mixture is then released so as to free the dissolved methanol, and is fed into the finisher 6 which is maintained at 225–230° C. under atmospheric pressure.

This finisher is topped by a rectification column 8 and a condenser 9. The methanol liberated on releasing the pressure, as well as the methanol produced by the reaction taking place in the finisher, is collected continuously at the outlet of the condenser, at a rate of 200 g./hour. Ethylene glycol is also collected at a rate of 850 g./hour. It follows from the amount of methanol formed that the overall degree of conversion of the methyl terephthalate is about 99.5%. A mixture of β-hydroxyethyl terephthalate and its oligomers is collected at the bottom of the finisher at 11.

EXAMPLE 2

In an apparatus (as shown in FIG. 3, identical with that of FIG. 1, but additionally comprising a feed tube 13 at the midpoint of reactor 1), a stream of 8160 g./hour of methyl terephthalate at 170° C. is introduced through tube 2 and ethylene glycol is introduced through tubes 3 and 13 at the rate of 2730 g./hour and 1690 g./hour respectively, this glycol being preheated to 180° C. and containing 0.08% of calcium acetate and 0.02% of antimony trioxide. The pressure at the bottom of the reactor is about 1.6 bars gauge. The temperature, which is maintained at 175° C. at the bottom of the reactor, increases progessively from stage to stage and reaches 230° C. at the top. The methanol liberated is collected by the condenser 10 at a rate of 2290 g./hour corresponding to an 85% degree of conversion of the methyl terephthalate at the top of the reactor. The pressure on the mixture leaving the reactor is then released and the mixture introduced into the finisher maintained at 230°–235° C. The methanol liberated as a result of the pressure release is collected in 12 at a rate of 325 g./hour and the β-hydroxyethyl terephthalate and its oligomers are collected at the bottom of the finisher at 11. The overall degree of conversion of the methyl terephthalate is about 97.3%.

We claim:
1. Process for the continuous preparation of a glycol phthalate which comprises continuously passing a mixture of an alkylene glycol of 2 to 4 carbon atoms and a lower alkanol phthalate in ratios between 1:1 to 4:1 respectively into the lower part of a first heated reaction zone, continuously removing lower alkanol, but substantially no alkylene glycol, overhead as vapour from the said first zone, continuously removing liquid reaction product from the said first zone and feeding it to a finisher reaction zone at a pressure not higher than the said first zone, and withdrawing from the said finisher zone, as vapour overhead, lower alkanol vapour and any excess of alkylene glycol, and, as liquid, the alkylene glycol phthalate product, and wherein the temperature of the said first reaction zone increases from bottom to top.

2. Process according to claim 1 in which the lower alkanol phthalate is methyl terephthalate and the alkylene glycol is ethylene glycol.

3. Process according to claim 1 in which the first and finisher reaction zones are both at a temperature of 170° to 270° C. and at a pressure of 1 to 5 bars gauge.

4. Process according to claim 1 in which the first zone is operated at superatmospheric pressure and the finisher zone at substantially atmospheric pressure.

5. Process according to claim 1 in which the lower alkanol phthalate is introduced into the lower part of a heated vertical stepwise reaction zone and the alkylene glycol is introduced partly at the bottom and partly at higher points of the reaction zone.

6. Process according to claim 1 in which the lower alkanol phthalate is a terephthalate.

References Cited

UNITED STATES PATENTS 2,829,153   4/1958   Vodonik _____ 260—475
3,385,881   5/1968   Bachmann et al. _____ 260—475

FOREIGN PATENTS 1,359,050   3/1964   France.

LORRAINE A. WEINBERGER, Primary Examiner
E. JANE SKELLY, Assistant Examiner